(12) United States Patent
Fisher et al.

(10) Patent No.: US 11,095,724 B2
(45) Date of Patent: Aug. 17, 2021

(54) INVITATION LINK FOR LAUNCHING MULTI-USER APPLICATIONS

(71) Applicant: Google LLC, Mountain View, CA (US)

(72) Inventors: Kristie Fisher, Los Angeles, CA (US); Mingjie Chen, Mountain View, CA (US); Matthew Vera, San Jose, CA (US); Saif Khalaf, Mountain View, CA (US); Haochen Liu, San Jose, CA (US); Justin Bischoff, Mountain View, CA (US); Sam Cheung, San Francisco, CA (US); Catherine Hsiao, San Mateo, CA (US)

(73) Assignee: Google LLC, Mountain View, CA (US)

( * ) Notice: Subject to any disclaimer, the term of this patent is extended or adjusted under 35 U.S.C. 154(b) by 124 days.

(21) Appl. No.: 16/244,583

(22) Filed: Jan. 10, 2019

(65) Prior Publication Data

US 2020/0228610 A1    Jul. 16, 2020

(51) Int. Cl.
*H04L 29/08* (2006.01)
*A63F 13/30* (2014.01)
*A63F 13/28* (2014.01)
*A63F 13/48* (2014.01)

(52) U.S. Cl.
CPC ............ *H04L 67/147* (2013.01); *A63F 13/30* (2014.09); *A63F 13/48* (2014.09); *A63F 2300/407* (2013.01)

(58) Field of Classification Search
CPC ........ H04L 67/147; A63F 13/48; A63F 13/30; A63F 2300/407; A63F 13/355; A63F 13/493; A63F 13/795
See application file for complete search history.

(56) References Cited

U.S. PATENT DOCUMENTS

| | | | |
|---|---|---|---|
| 7,401,150 B2 | 7/2008 | Shea et al. | |
| 2006/0026288 A1* | 2/2006 | Acharya | G06Q 10/10 709/227 |
| 2007/0055728 A1* | 3/2007 | Shea | H04L 67/14 709/204 |
| 2007/0123353 A1 | 5/2007 | Smith | |
| 2015/0165319 A1* | 6/2015 | Bono | A63F 13/35 463/42 |
| 2016/0250551 A1* | 9/2016 | Suzuki | A63F 13/795 463/24 |
| 2017/0087464 A1 | 3/2017 | Perry et al. | |

OTHER PUBLICATIONS

International Search Report and Written Opinion dated Mar. 23, 2020 for International Application No. PCT/US2019/056158, 17 pages.

* cited by examiner

*Primary Examiner* — Soe Hlaing (57) ABSTRACT

The disclosed subject matter enables a user to construct a selectable link to invite others to launch directly into a same session of a multi-user application, such as a game or party. The inviting user may construct the link without ever launching the multi-user application. Subsequently, both the inviting and invited users may share the link with others using any conventional form of electronic communication.

26 Claims, 10 Drawing Sheets

| Player ID 205 | Invite ID 210 | App ID 215 | State 220 | Invitor ID 225 | Link 230 |
|---|---|---|---|---|---|
| Matt | 1234 | Game1 | Pending Sent | Matt | sn9a8dajyh |
| Trey | 1234 | Game1 | Pending Accepted | Matt | |
| Aaron | 1234 | Game1 | Pending Accepted | Matt | |

INVITATION LINK FOR LAUNCHING MULTI-USER APPLICATIONS

BACKGROUND

Coordinating multiplayer games and multiuser parties on current console and computer systems generally requires several steps. Players usually negotiate the logistics of a gaming session with their peers using e-mail, instant messaging, SMS/text messaging, chat, or the like. Once the decisions are made on which game to play and when, one player agrees to launch the game as the host and sends invitations to the other players to enable them to join the same game session. The other players cannot join the game until the host player has launched the game, searched for and correctly identified the other players by their associated gaming IDs, and created the multiplayer session. All players, including the host, must usually possess the same version of the game in order to play.

BRIEF SUMMARY

According to an embodiment of the disclosed subject matter, a method may include receiving a first user identifier uniquely associated with an invitor, receiving a second user identifier, different from the first identifier, and uniquely associated with an invitee, receiving an application identifier associated with a selected application, generating an invitation identifier based on the application identifier and the first user identifier, generating a link uniquely associated with the invitation identifier, the link causing the application to launch in response to the link being selected by the invitor or invitee, and providing the link. The method may include receiving an indication that the invitor or invitee has selected the link and launching the invitor or invitee into a unique session of the application, the unique application session uniquely associated with the invitation identifier. The invitor may not own the application. The invitee may not own the application.

The link may be provided prior to and independently of the application being launched. The link may be provided via an interface of the launched application. Before the application is launched, the link may be provided via a web browser interface. The link may cause the application to launch in a mode based on a selected parameter, such as where the application is a video game and the selected parameter corresponds to savepoint or level information.

The method may include receiving a selection of a second device using a first device, receiving an indication that the invitor or invitee selected the link using the first device, and launching the application on the second device. The first device may be incapable of launching the application. The method may include receiving a first indication that the invitee has selected the link in response to the invitee selecting the link, regardless of whether the invitor has selected the link. The method may include receiving a second indication that the invitor has selected the link in response to the invitor selecting the link, wherein the first indication is received prior to the second indication.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Coordinating multiplayer games or parties on current console and personal computer systems can be inconvenient and cumbersome due to the number of sequential steps that are involved. Should the hosting player experience any difficulties while performing these tasks or otherwise withdraw, the other players cannot begin the gaming session or may be left waiting needlessly. Where one or more players do not possess a game, possess a different version of a game, or lack the required game expansions, those players may be unable to join.

The present subject matter discloses systems and techniques for providing a link that enables a user to invite others directly into a multi-user application, such as a game or party. The user ("invitor") may obtain the link in a variety of ways as disclosed herein. For example, the invitor may create the link from within a launched multi-user application, though this is not necessary. As another example, the link may be created by the invitor solely for inviting others without ever launching into the multi-user application to which the link applies. Once the link is created, the invitor may communicate it to other users ("invitees") using any conventional manner of electronic communication, such as chat, e-mail, instant messaging, social media, SMS messaging, and the like. The link may also be posted publicly, such as on a website, or in print media. Any user who sees the link may join the other invitees in a same unique session and/or share the link with others, such that inviting large numbers of users to participate in a gaming or party session becomes a relatively simple matter. In some embodiments, a user may receive a message containing the link on virtually any first device capable of receiving the communication, but elect to launch into the multi-user application on a second device instead. Under certain circumstances, the users may not be required to be have ever launched the multi-user application previously or even possess a copy of the multi-user application to join a session.

Instances of a multi-user application may be executing on thousands of computing devices simultaneously by multiple users. In general, each user may execute an instance of the multi-user application using his or her computing device and may not participate in more than one instance of a multi-user application. A session may comprise one or more instances, where each user's instance of the session participates with one or more other users' instances within the session. Because each user may participate in only one instance, and likewise, one session, each session is unique based on the set of unique users participating within it. For example, Kevin and Ian may be playing "Game Title" together on each of their respective computing devices. Each of Kevin and Ian's computing devices may execute an instance of "Game Title." Both Kevin's and Ian's instances taken together may constitute a unique session of "Game Title," since each user's instances is participating with the other's instance and neither Kevin nor Ian may be playing within another session. If user Amelia wishes to join in playing with Kevin and Ian, she would want to join the same unique session occupied by Kevin and Ian. Therefore, while each of the three users would execute three respective instances of "Game Title," all three users would be participating within the same single unique session. Alternatively, Amelia may wish to play alone. In that case, she would execute a single instance of "Game Title," which would also define her unique session.

While the subsequent discussion and associated figures will describe the example embodiments in the context of a multiplayer game, it should be appreciated that the concepts may apply to various non-gaming environments. For example, aspects and features of the disclosed subject matter may be pertinent to any multi-user application, such as those used for conferencing, auctions and sales, social and recreational activities, group collaboration, education, demonstrations, presentations, and exhibiting various other forms of audio and/or visual media. Accordingly, the scope and context of embodiments disclosed herein are not limited to multiplayer gaming applications.

Figure 1:
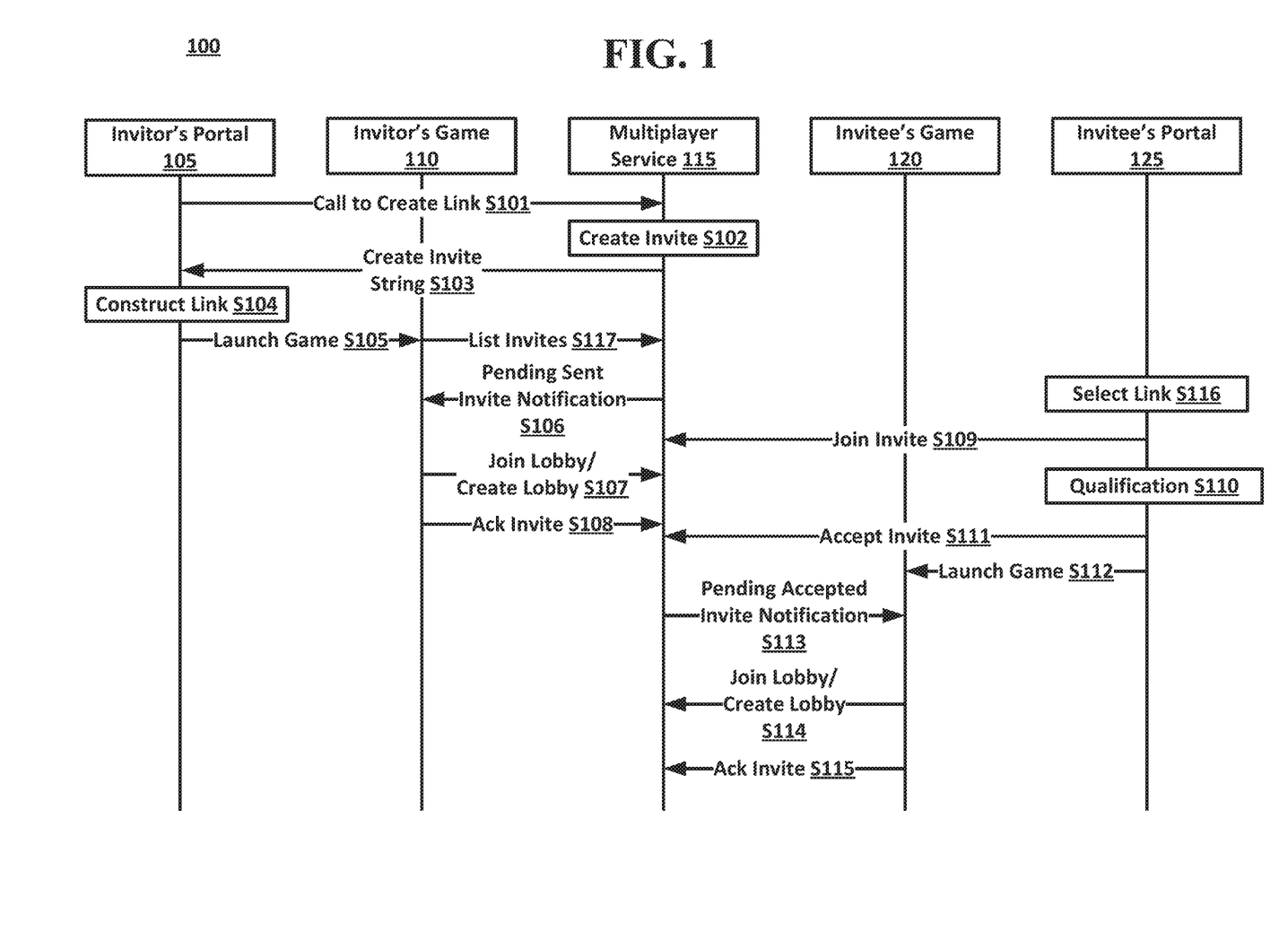
FIG. 1 shows a flow diagram according to an embodiment of the disclosed subject matter.
Figure 2A:
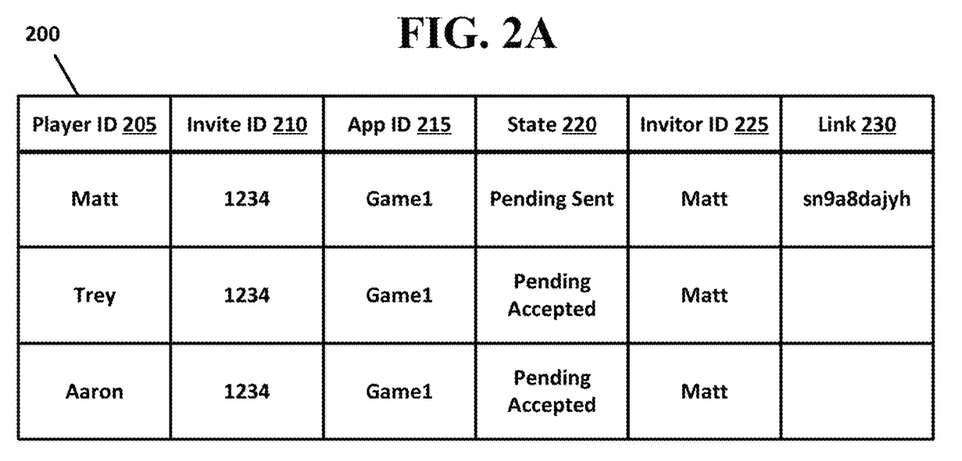
FIG. 2A shows a table according to an embodiment of the disclosed subject matter.

FIG. 1 shows an overview of an example multiplayer flow 100 of an invitor and invitee users' interactions through the invitor's game 110, invitee's game 120, invitor's portal 105, invitee's portal 125, and multiplayer service 115. From the invitor portal 105, an invitor user may initiate a process that creates a link in step S101 associated with a multiplayer game. It should be appreciated that the multiplayer game may be stored and executed locally, such as on a computing device being used by the invitor, or remotely, such as on a cloud-based gaming server. Accordingly, the invitor's game 110 and invitee's game 120 should be more broadly understood to be representations of a multiplayer game presented to the invitor and invitee and not necessarily user-owned copies of a game stored and executed on the users' computing devices. The portal 105 may be provided in a variety of ways, including via a software platform application, a website, a web browser, a web browser plugin or extension, via a menu within the multiplayer game itself or the like, or any other suitable mechanism. Responsive to the invitor user executing a portal function to create the link in step S101, a multiplayer service 115 may create a new invite in step S102 and generate an invite string associated with the invite in step S103. The invite created in step S102 may be used internally by the multiplayer service 115 and may be generated based on a player ID 205 and an invitation ID 210, as shown in FIG. 2A. Each row of table 200 may represent an outstanding invite. Each player ID 205 may be unique to each user interacting with the multiplayer service 115. Each invite ID 210 may be unique to the unique multiplayer game session created by invitor user when creating the link in S101. The multiplayer service 115 may record each outstanding invite and its associated state 220 in table 200, where each row may correspond to an invite on a per-user basis. For example, when an invitor user having player ID "Matt" generates a call to create a link to a multiplayer game session in step S101, a new row may be added to table 200 with the invitor user's player ID 205, the invitation ID 210 identifying the session, the app ID 215 identifying the game, the state of the invite 220, the player ID of the invitor 225, and the associated link 235. Additional data fields not shown may be included with each row of table 200. At this point, table 200 of the multiplayer service 115 contains a single row representing a single invite for "Matt" with state 220 set to "Pending Sent."

Figure 2B:
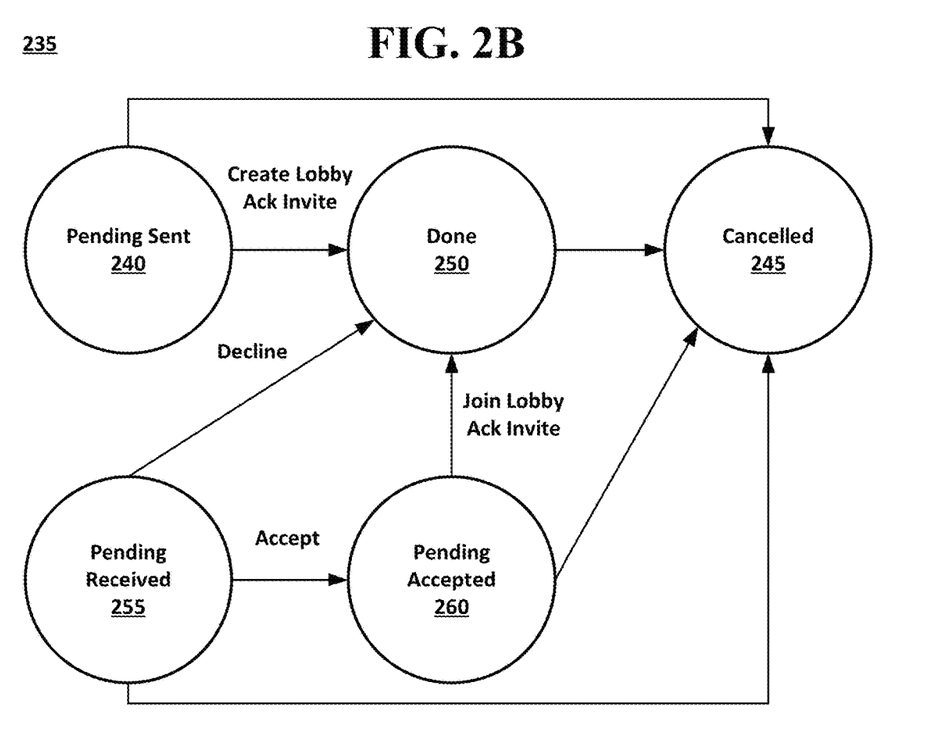
FIG. 2B shows a state diagram according to an embodiment of the disclosed subject matter.

FIG. 2B illustrates state diagram 235 governing the state 220 of each invite stored in table 200. Pending Sent state 240 may be the initial state for an invitor invite, while Pending Received state 255 may be the initial state for an invitee invite. Based on the invitee or invitor user's interactions through each respective portal 105/125, an invite stored in table 200 may terminate upon acceptance of the invite. In this case, the invite may transition to the Done state 250 when the user joins the multiplayer game session. An invite stored in table 200 may also terminate upon cancellation of the invite, such as where a user indicates that the invite should be cancelled, or it is determined that the session associated with the invite is no longer active. In this case, the invite may transition to the Cancelled state 245 after the associated multiplayer game session begins and ends or where a timeout period has elapsed.

Returning to FIG. 1, the invite string created in step S103 may be returned to the invitor's portal 105 where it may be used to construct a link in step S104 that may be presented to the invitor user. The link created in step S104 may be presented textually, in the form of invite string created in step S103 or any other string, a uniform resource locator (URL), a hyperlink, pictorially as an image, icon, photo, emoticon, or an animation, or as a combination of image and text. Accordingly, the textual content of a link may visible, obscured, or modified. The invitor user, having received the link created in step S104, may send the link to an invitee user who may select the link in S116 if he or she wishes to play. In one example, where the invitee user having player ID "Trey" selects the link received from invitor Matt in step S116, the invitee's portal 125 may resolve the link as a multiplayer game link and call the multiplayer service 115 to join the invite in step S109. Multiplayer service 115 records the invitee user's selection of the link in table 200 by creating a new row with the invitee user's player ID 205, "Trey," and sets state 220 to Pending Received 255. The invitee's portal 125 may perform a variety of qualification checks in step S110 against Trey, including whether Trey has selected the link from a device capable of participating in the multiplayer game, whether Trey has elected to transfer the multiplayer game to an alternate device, whether Trey owns the multiplayer game, and whether Trey has exceeded an allocated amount of playing time, for example. Upon completing the qualification step S110, the invitee portal 125 may accept the invite on Trey's behalf in step S111 by calling multiplayer service 115, which transitions Trey's invite to the Pending Accepted state 260. Invitee portal 125 may then launch directly into the invitee's game 120 in step S112. Launching "directly" may be understood to mean without requiring additional steps by the user. For example, where a multiplayer game is launched directly in response to selecting a link, the user may not need to take steps to perform configurations, exit currently launched applications, locate a game session, locate other players, or specify game server information. In response to receiving the invite acceptance in step S111, the multiplayer service 115 may notify the invitee's game 120 that there is an invite in the Pending Accepted state 260 in step S113. The invitee's game 120 may then call the multiplayer service 115 to find and join the correct game lobby based on the invite ID 210 from the invite that Matt sent. A game lobby may be, for example, a menu screen where joined players can view game settings, player profile information, and communicate with other players via voice chat, textual messages, or the like. Alternatively, where the invitor has not joined the multiplayer game session, the invitee's game 120 may create the multiplayer game lobby based on the invite ID 210 from the invite that Matt sent. The invitee's game 120 may then acknowledge the invite to the multiplayer service 115, which transitions the invitee's invite state from Pending Accepted 260 to Done 250. It should be appreciated that users who select the link may alternatively launch directly from the respective portal 105/125 into a multiplayer game session without first accessing a multiplayer game lobby.

The invitor need not join the multiplayer game session, even though he or she created the link. This feature may allow invited users who select the link to enter the multiplayer game session immediately, regardless of whether the invitor user does the same. Similarly, if the invitor joins the multiplayer game and subsequently leaves, the multiplayer game session may remain open until all players have left. The first player to join the multiplayer game session may be designated the host player. The host player may have exclusive privileges, such as the right to control various game parameters, mute other players, and eject other players from the multiplayer game session. The first player may be designated as the host even if the first player is an invitee rather than the invitor. Where the invitor user subsequently joins, he or she may be designated the host player upon entry. Where the invitor is designated the host and subsequently leaves, any of the remaining players may be designated as the new host based on random selection, player seniority, or other various schemes.

Returning to FIG. 1, the invitor's portal, upon constructing the multiplayer game link in S104 may directly launch the game automatically in S105 or manually by selecting the newly-created link at a later time. It should be appreciated that construction of the link in step S104 occurs independently of whether the game is launched in step S105. Indeed, the invitor user need not ever launch the game in S105. Upon launching the invitor's game 110 in S105, the multiplayer service 115 may be called to list any pending invites in step S117. In response to receiving the call from the invitor's game in 110 in step S117, multiplayer service 115 may notify the invitor's game 110 in step S106 that there is an invite in the Pending Sent state 240. The invitor's game 110 may then call the multiplayer service 115 to create and join the correct multiplayer game lobby in step S107 based on the invite ID 210 generated in step S102. Alternatively, where an invitee user has selected the link to join the multiplayer game prior to the invitor user, the multiplayer game lobby based on the invite ID 210 may already be created in step S114, and the invitor user may join the multiplayer game lobby instead. The invitor's game 110 may then acknowledge the invite in step S115, which transitions the invitor's invite state from Pending Sent 240 to Done 250.

Figure 3A:
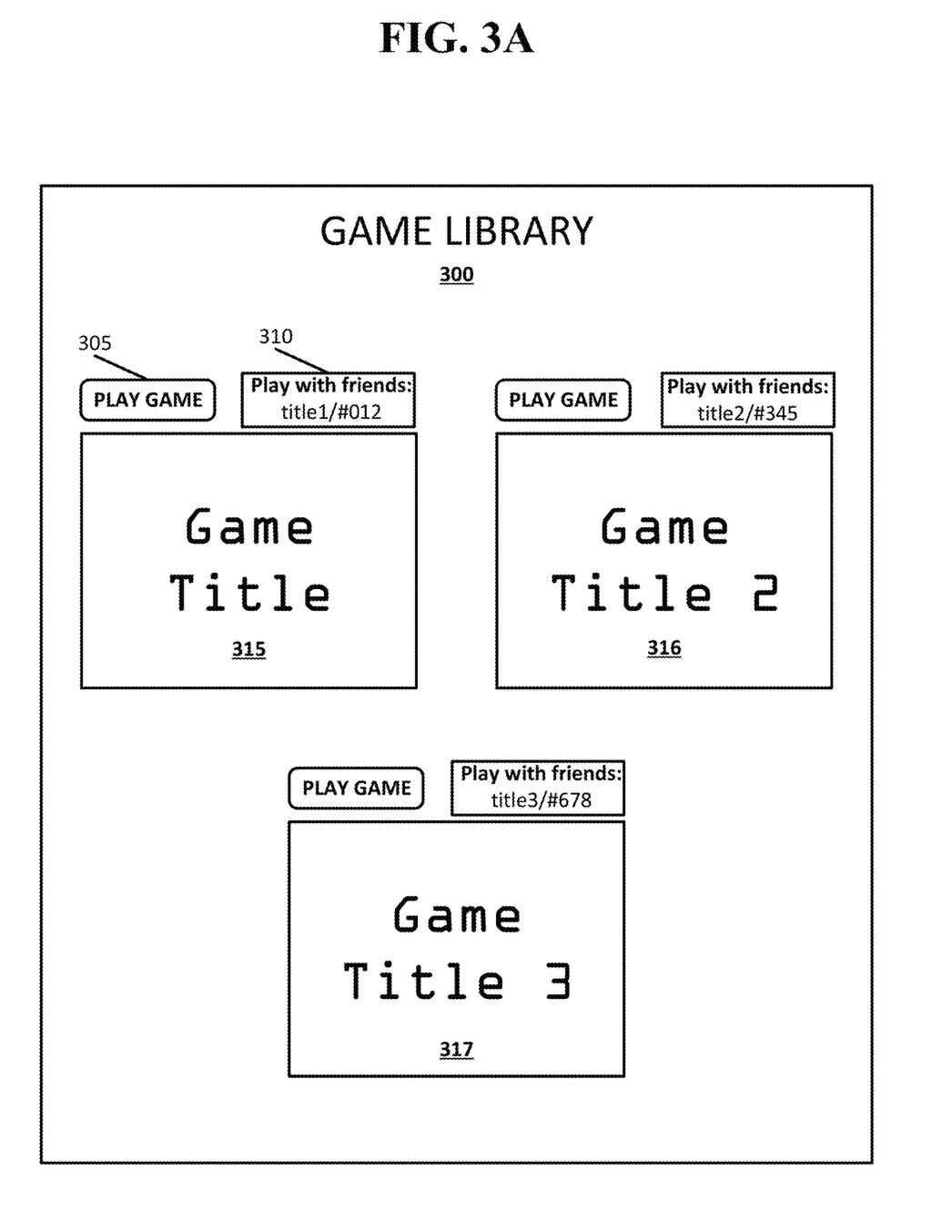
FIG. 3A shows a game library interface according to an embodiment of the disclosed subject matter.

The invitor user's call to create the link in step S101 via invitor portal 105 may be achieved in several ways. FIG. 3A depicts an example game library interface 300 where an invitor user is presented with an assortment of multiplayer game titles 315-317. Each game title 315-317 may be selected and may additionally include an associated "PLAY GAME" button 305 and a "PLAY WITH FRIENDS" button 310. For example, selecting button 305 may launch into the game directly and may be utilized for solo play or where matchmaking of players would subsequently occur. Selecting button 310 may copy an associated multiplayer game link into system memory where it may be accessed from an operating system clipboard application and may be pasted in a communication targeted to the desired invitees using the conventional methods previously discussed. It should be appreciated from this example that the act of the invitor user launching the game library interface 300 via invitor portal 105 may correspond to performing step S101 of FIG. 1 to execute a call or series of calls to create the multiplayer game links 310.

Figure 3B:
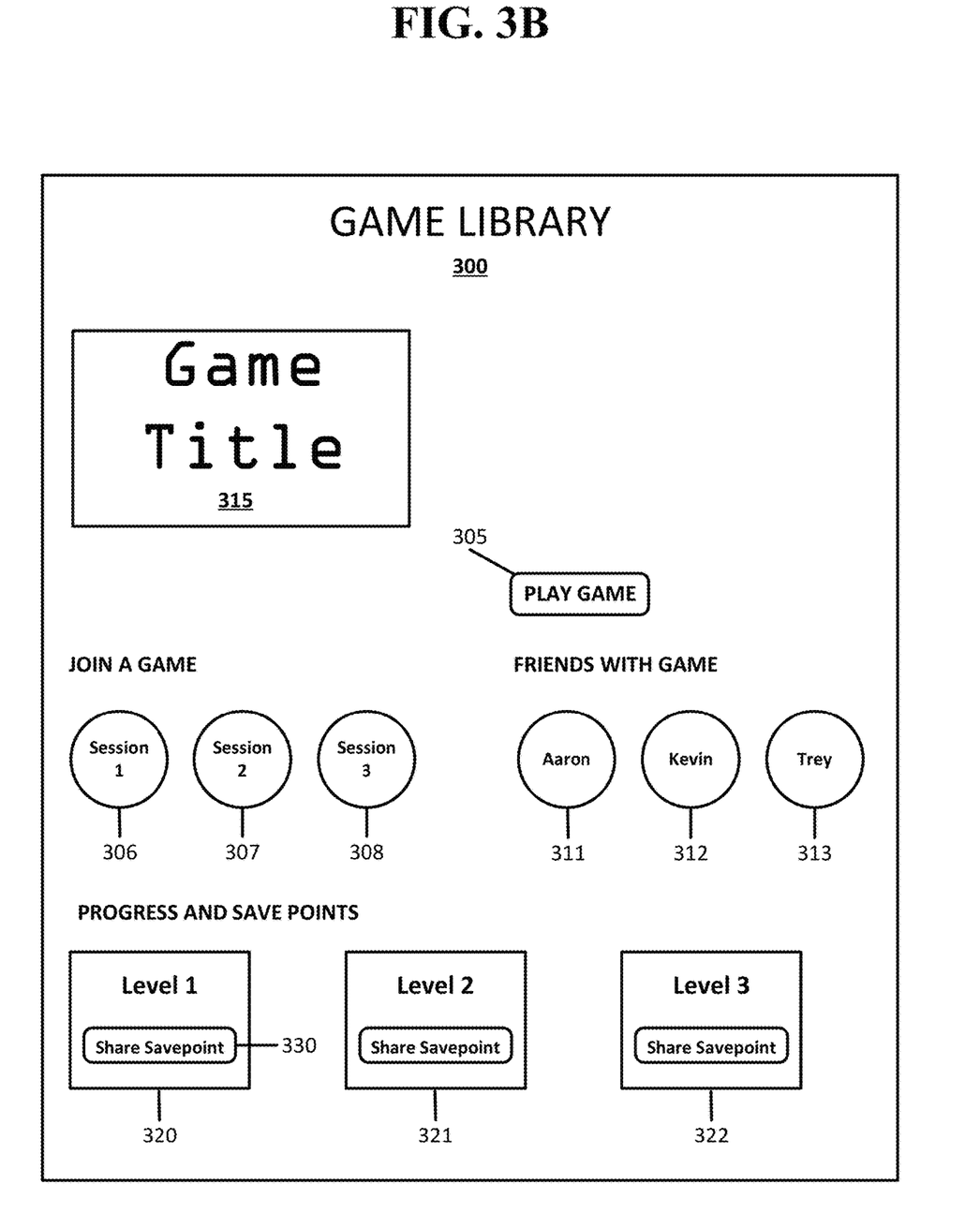
FIG. 3B shows a game library interface according to an embodiment of the disclosed subject matter.

Upon user selection of multiplayer Game Title 315, the interface may update to reflect additional information associated with the selected multiplayer Game Title 315 as illustrated in FIG. 3B. In addition to the "PLAY GAME" button 305 previously discussed, the game library interface 300 may present a list of ongoing sessions 306-308 of Game Title 315. Selecting any of ongoing sessions 306-308 may correspond to performing S115 of FIG. 1 to join a multiplayer game as an invitee. Game library interface 300 may also include a listing of the user's friends 311-313 who own Game Title 315 or are otherwise eligible to play. Selecting any of friends 311-313 may provide a variety of functionalities, including opening a chat box with the friend, generating and sending a link to play Game Title 315, or displaying player statistics, for example. Game library interface 300 may also include listing of the user's savepoints 320-322, which may represent a placeholder of a user's progress, such as within a game level and with all of the associated assets, unlocks, status, and accompanying statistics within Game Title 315. Selecting any of the savepoints 320-322 may launch directly into Game Title 315 at the user's selected savepoint. Selecting the "share savepoint" button 330 may copy a multiplayer game link beginning from the selected savepoint 320 to a clipboard application where it may be shared with other invitees as previously discussed. Alternatively, selecting button 330 may present a selectable list of the user's friends to which the link to the savepoint may be sent, may post the savepoint link to a user's social media account, or may publish the savepoint link to a database index, where it will be displayed as an available multiplayer game session 306-308 under the "JOIN A GAME" heading within Game Title 315 game library interface 300 of other users.

Figure 4:
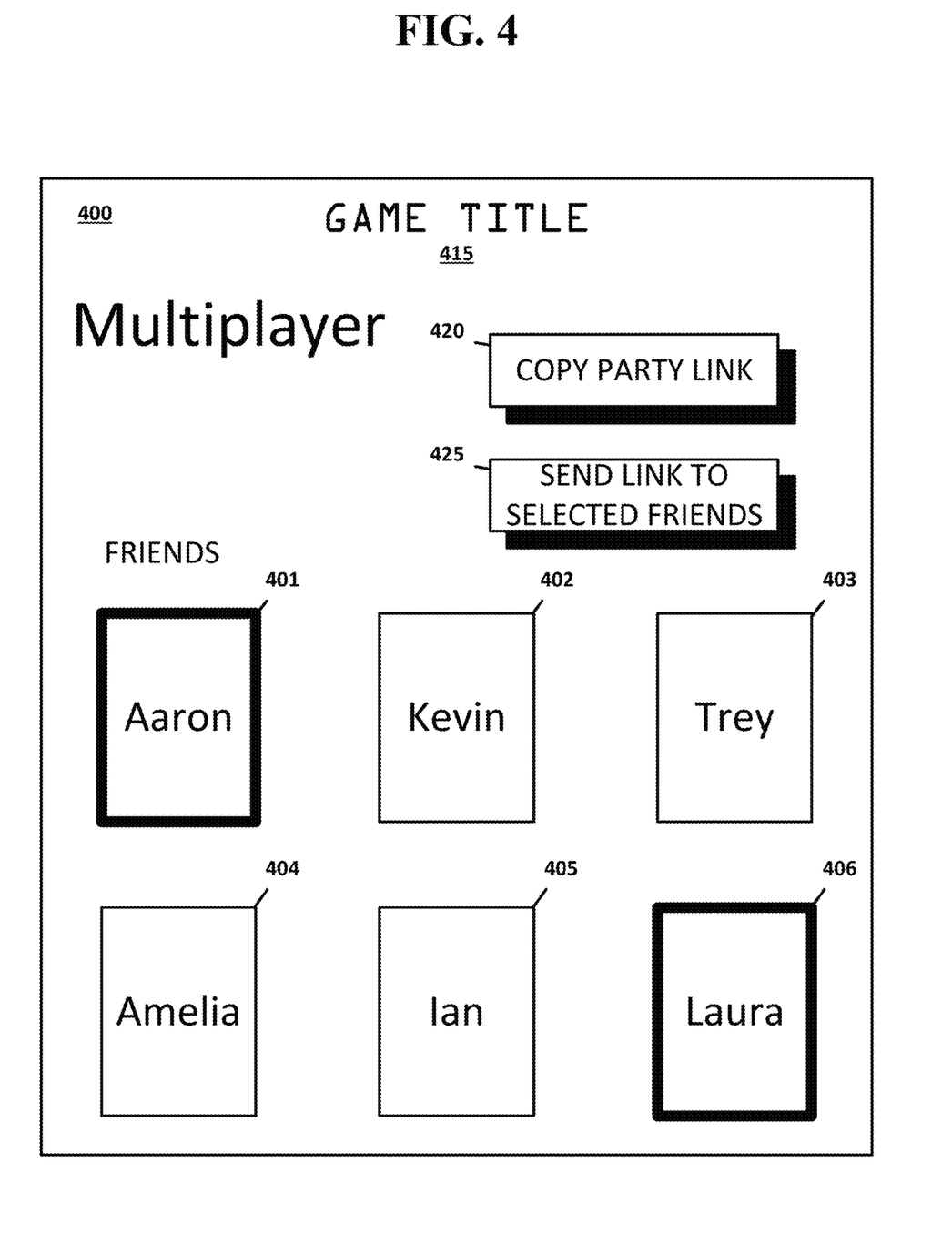
FIG. 4 shows a game interface according to an embodiment of the disclosed subject matter.

An invitor user may also create a link from within a multiplayer game. FIG. 4 illustrates features of an example in-game interface 400 of Game Title 415 that may be presented to the user. The in-game interface 400 may include a listing of the user's friends 401-406 that may be individually selected to send a link to join the multiplayer game session using "SEND LINK TO SELECTED FRIENDS" button 425. For example, and as shown in FIG. 4, Aaron 401 and Laura 406 may be selected. When the user subsequently selects the "SEND LINK TO SELECTED FRIENDS" button 425, Aaron 401 and Laura 406 may receive a selectable link that would, if selected, join them as invitee users in the invitor user's session of Game Title 415. Alternatively, or in addition, a "COPY PARTY LINK" button 420 may be provided to copy the associated multiplayer game link into system memory where it may be accessed from an operating system clipboard application and may be pasted in a communication targeted to the desired invitees using the conventional methods previously discussed. It should be appreciated from this example that the act of the invitor user launching the Game Title or Game Title in-game interface 400 via invitor portal 105 may correspond to performing step S101 of FIG. 1 to execute a call or series of calls to create the multiplayer game link to be copied via button 420 or sent to friends via button 425.

Figure 5:
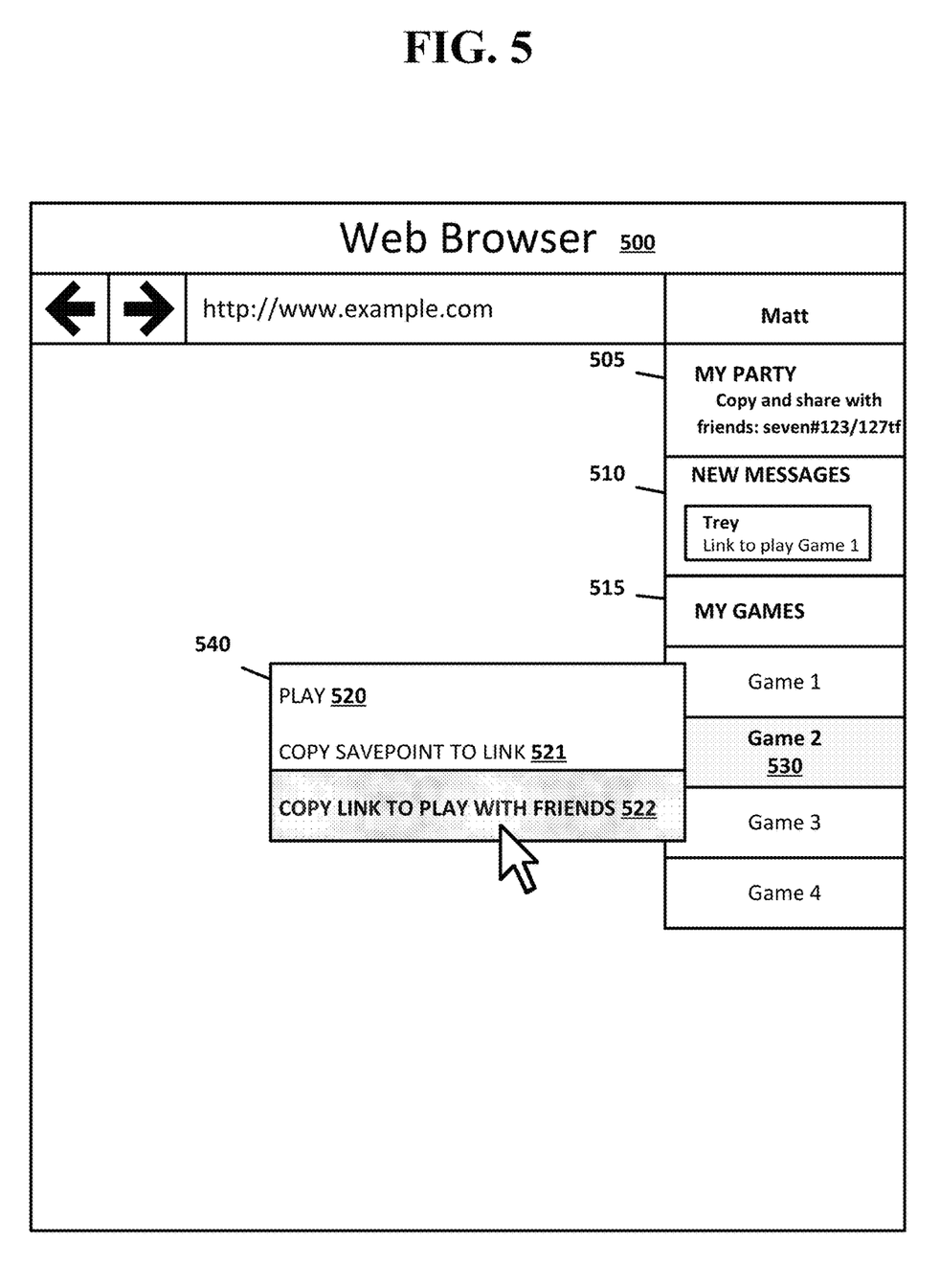
FIG. 5 shows a web browser interface according to an embodiment of the disclosed subject matter.

An invitor user may also create a link using a web browser. FIG. 5 illustrates an example web browser interface 500. Interface 500 may be provided for example, via a website, via a web browser extension or plugin, or integrated within the web browser itself. Interface 500 may include a party link 505 associated with the user. Party links 505 may operate similarly to multiplayer game links but are not necessarily associated with a multiplayer game. Upon selection of a party link, the invitee's portal 125 may launch directly into a multi-user chat or video conference with other invitees of the same party. Once within the multi-user chat or video conference, users may decide to create a multiplayer game link and launch from the party directly into multiplayer game. Interface 500 may additionally include an indication 510 of new messages and invites to parties and/or multiplayer games. FIG. 5 depicts an example where user Matt, while using web browser 500, has received a message 510 from user Trey containing a multiplayer game link to launch directly into Game 1. Selecting the multiplayer game link Interface 500 may also include a game library 515 having a number of games that may be launched. In an example, user Matt has selected "Game 2" 530. In response, interface 500 may present options 540 to play the game 520, copy a savepoint to a link 521, and to copy a link to play the game with friends 522. Selecting option to play the game 520 may be utilized for solo play or where matchmaking of players would subsequently occur. Selecting option 521 may copy a multiplayer game link at a default or selected savepoint to a clipboard application where it may be shared with other invitees as previously discussed. Alternatively, selecting option 521 may present a selectable list of the user's friends to which the link to the savepoint may be sent, or may post the savepoint link to a user's social media account. Selecting option 522 may copy a multiplayer game link to Game 2 into system memory where it may be accessed from an operating system clipboard application and may be pasted in a communication targeted to the desired invitees using the conventional methods previously discussed. It should be appreciated from this example that the act of the invitor user selecting the option "COPY SAVEPOINT TO LINK" 521 or the option "COPY LINK TO PLAY WITH FRIENDS" 522 through the interface 500 may correspond to performing step S101 of FIG. 1 to execute a call or series of calls to create the aforementioned links copied in options 521 and 522. By example, the act of Matt selecting the "Link to play Game 1" message 510 received from Trey may correspond to performing step S116 of FIG. 1 to join Trey's unique session of Game 1 as an invitee. Correspondingly, it should be appreciated that the act of the invitor user launching the web browser interface 500 may correspond to performing step S101 of FIG. 1 to execute a call to create the party link 505 that may be copied and communicated to friends and other users.

Figure 6:
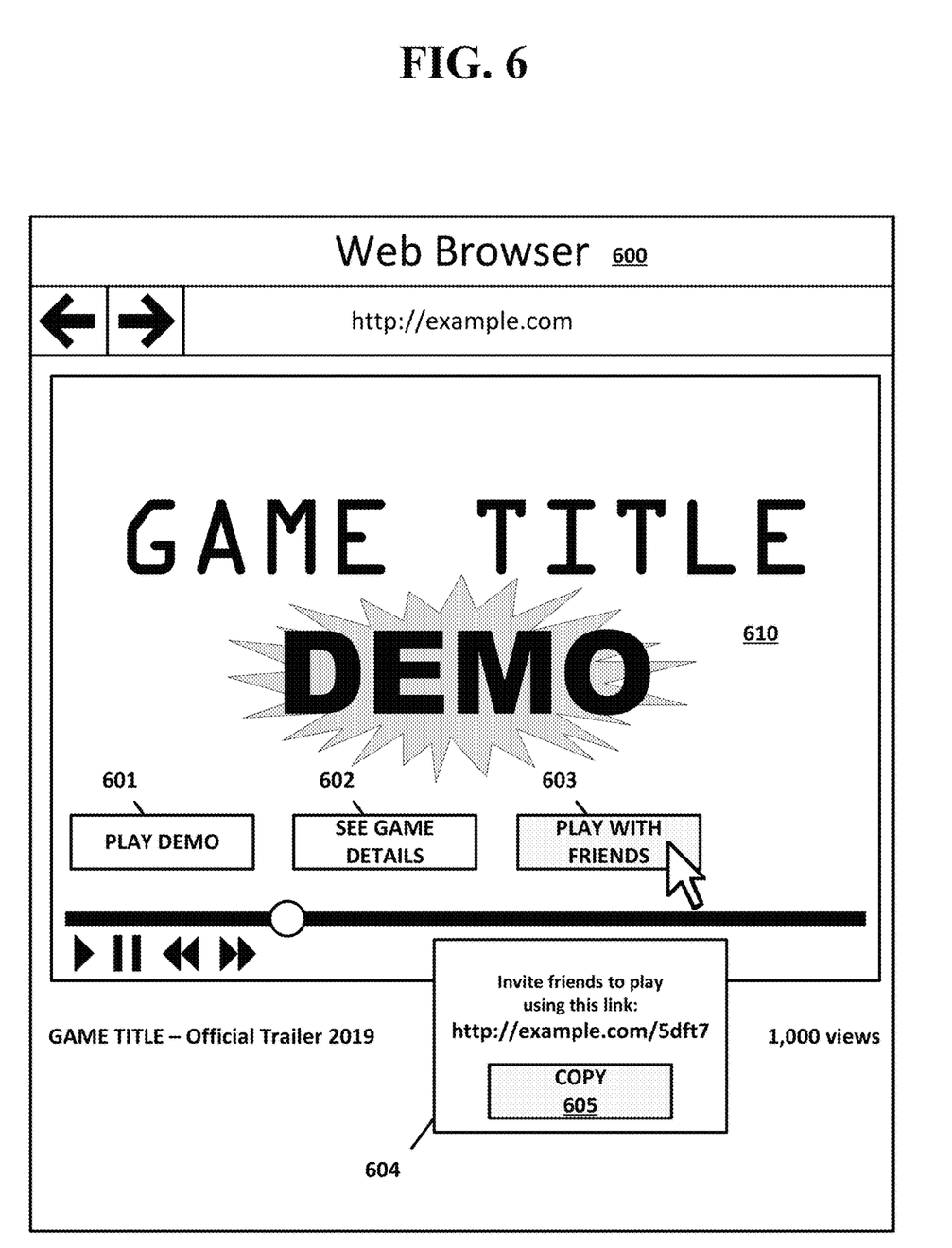
FIG. 6 shows a web browser interface according to an embodiment of the disclosed subject matter.

Links may be embedded within video content. FIG. 6 illustrates an example web browser interface 600. Web browser interface 600 may load a video 610 from a website and provide a variety of user-selectable buttons 601-603 associated with the content of video 610. For example, video 610 may be a trailer for a game title. Button 601 may directly launch into a demonstration version of game title 600 in either solo or multiplayer game modes. In the case of a multiplayer game mode, button 601 may implemented using a multiplayer game link as previously described such that all viewing users or a subset of all viewing users are launched into the same unique game title demonstration session. As previously discussed, the textual content of a link may be visible or obscured. For example, the game publisher associated with the game featured in video 610 may wish to make the link available only through viewing the trailer video 610. By obscuring the underlying text of game link selected through button 601, users may be unable to copy and paste the link, thereby preventing and/or reducing access to the game through alternate and/or undesirable forums. Selection of button 602 may provide additional information about the game, such as pricing, release date, system requirements and console availability, links to other games, and other details. Button 603 may provide a multiplayer game link 604 to the game title that may be the same as or may be distinct from the underlying game link launched through selection of button 601. In this way, a user that selects and shares link 604 with other users may start a multiplayer game title demonstration session limited to only those players who have received the link, rather than users from the general public. Button 605 may copy the multiplayer game title link into system memory where it may be accessed from an operating system clipboard application and may be pasted in a communication targeted to the desired invitees using the conventional methods previously discussed.

Figure 7:
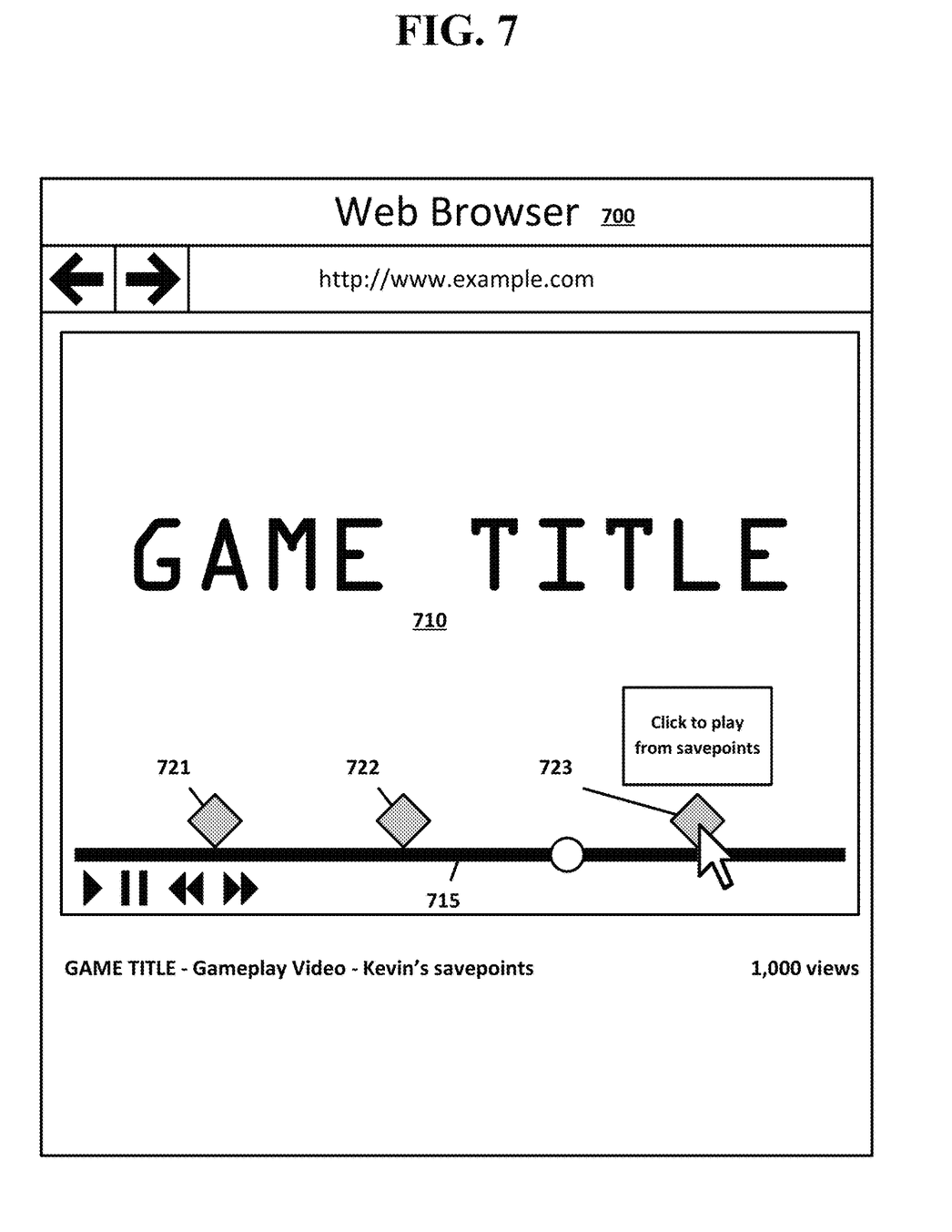
FIG. 7 shows a web browser interface according to an embodiment of the disclosed subject matter.

Savepoint links may be embedded within video content. FIG. 7 illustrates an example web browser interface 700. Web browser interface 700 may load a video 710 from a website. The video 710 may be a gameplay video showing a player's progress in a specific game title. A progress bar 715 may be provided within interface 700 to indicate which portion of the video is currently being shown in relation to the whole. Savepoint markers 721-723 may be displayed in conjunction with the progress bar 715, representing a selectable game link. Selecting any of the savepoint markers 721-723 may launch directly into Game Title at the savepoint represented by the respective savepoint marker. Each savepoint marker 721-723 may correspond to the progress point of the player shown in gameplay video 710 at the temporal moment where the savepoint marker 721-723 exists on the progress bar 715. Any of savepoint markers 721-723 may be selectable by the user, regardless of the progress of video 710 along progress bar 715. As previously described with respect to FIG. 3, savepoints may correspond to a particular level and associated player attributes within the progression of Game Title or may be arbitrarily selected by the player whose gameplay is shown in video 710. The savepoint markers 721-723 within video 710 may be placed manually by a user or placed automatically by a video processor that may be implemented through hardware or a software algorithm executed by hardware.

Figure 8:
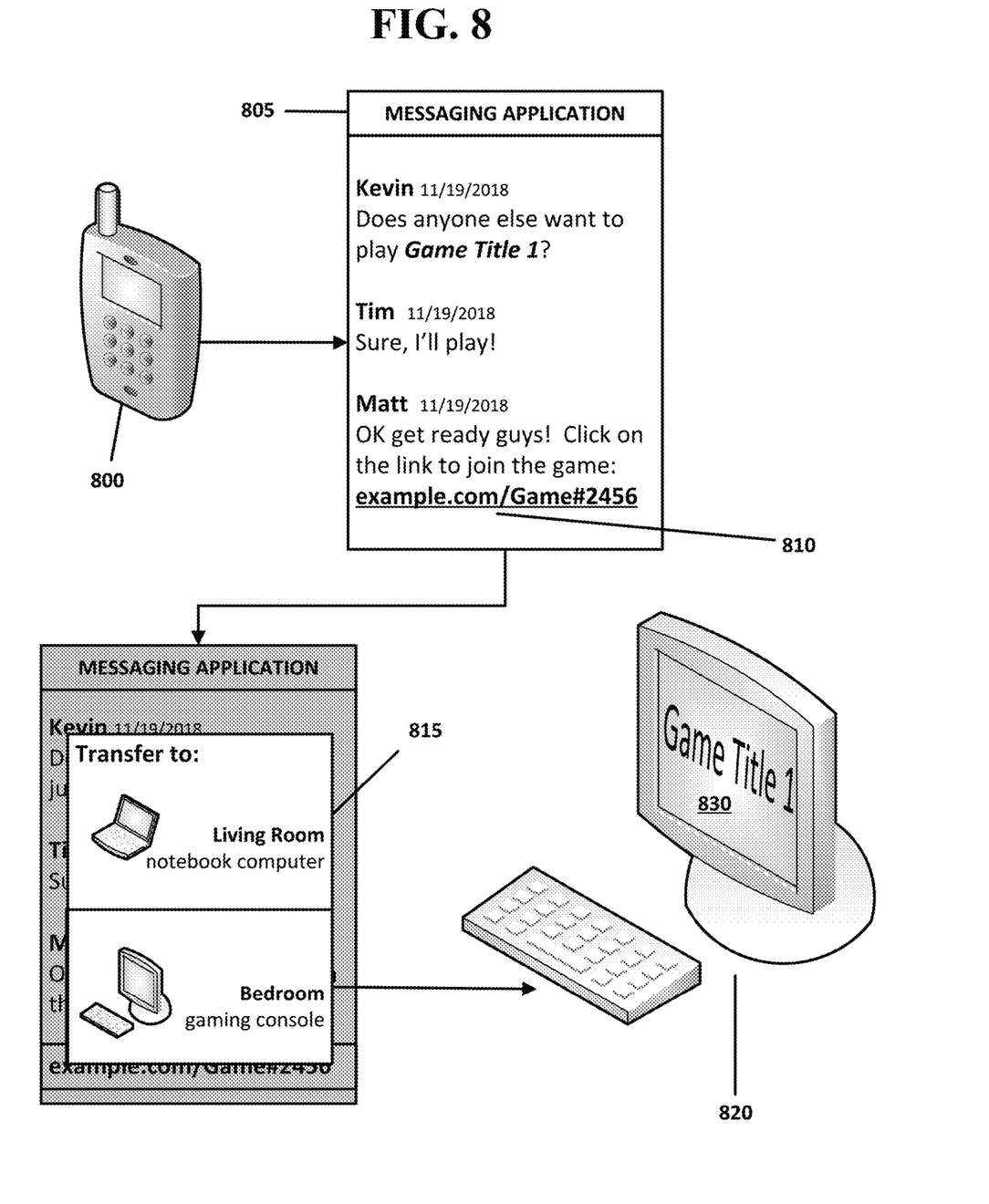
FIG. 8 shows an electronic communication between devices according to an embodiment of the disclosed subject matter.

As previously discussed, multiplayer game links and party links may be communicated using any conventional manner of communication between users. While nearly all modern electronic devices may be capable of conducting electronic communications, not all devices may be capable or desirable for providing a multiplayer gaming experience or, similarly for other types of entertainment and/or software products, may not be suitable for that particular type of software. Likewise, a user may possess several devices capable of providing a multiplayer gaming experience, e.g., a gaming personal computer, a gaming console device, a set-top box with a controller, a remotely-hosted gaming system, and a tablet computer, but prefer one over the other for various reasons. Accordingly, where more than one electronic device is available, a user that receives a game or party link via one electronic device may elect to transfer the launch of the game or party link to a second electronic device. FIG. 8 depicts an example embodiment where a user may receive electronic communication via a first electronic device 800. The electronic communication may be received via a communication application 805 executing on the first electronic device 800 and contain a multiplayer game link 810. Upon selecting link 810, the user may be presented with an option 815 to transfer the launch of the multiplayer game link 810 to a second electronic device 820. Option 815 may be presented in a pop-up menu, in a web browser, within another application, and the like. As a result, a multiplayer game session 830 associated with multiplayer game link 810 executes on the second electronic device 820. The second electronic device 820 need not be a dedicated gaming or computing device; it may merely have the ability to transmit, receive, and output information. Moreover, the second electronic device 820 need not be more computationally sophisticated or of higher performance the first electronic device 800. It should be appreciated that the user may wish to launch a particular game or party on one device or another for a variety of reasons, for example, based on remaining battery life, physical proximity to the user, the availability of network resources, and other factors.

In general, a user that creates a link as an invitor or selects a link as an invitee may be required to have purchased the game, or at least possess a right to play the game via an express or implied license. On the other hand, for example, a game publisher may create a link to allow a user to play a game that he or she otherwise neither purchased nor would otherwise be entitled to play as part of a promotion. For purposes of discussion, this user shall be known as a "guest" user. In this case, where the guest user selects the link to play a game, the invitee portal 125 will not reject the guest user's entry into the game 120 in step S110 for lacking ownership of the game. Alternatively, or in addition, a game publisher may allow a limited amount of playing time for a guest user in the context of a promotion, or where he or she has been invited by an invitor user who owns the game. A guest user may also be entitled to play a game that he or she does not own, for example through enrollment in a subscription gaming service. In this case, one or more games may be included as part of the subscription where a guest user may be entitled to join as an invitee in a multiplayer game or launch the game as a single player. As previously discussed, the invitor user who creates the link may not be required to launch the game 110. Therefore, it may be possible that a single invitor user who owns a game may create a link to provide an opportunity for one or more guest users to play a game 120 for an unlimited or limited amount of time in the absence of the invitor user's presence within the game. Typically, the game publisher, through creating a policy that may be enforced by the multiplayer service 115, may establish playing limits for guest users. The gameplay limits may be time-based, event-based, or otherwise based on duration and/or scope. For example, the multiplayer service 115 may eject a player after expiration of a predetermined amount of time, after the player progresses through a predetermined number of levels, after the player dies a predetermined number of times, or the like. With each gameplay limit, an associated warning message may be displayed to the user to indicate the remaining levels, time, or lives left, as appropriate.

Links may have a finite lifetime. The expiration of a link may be set according to a predetermined expiration time and date or based on the time elapsed since an event occurs. In the case where a game publisher may provide a game link as part of a promotion or to demonstrate a game, the link may exist for the length of the promotion period. Where a link may be created by an ordinary user, the link may expire 24 hours after its creation. The link may expire sooner than 24 hours, for example, where at least one user launches into a game session via the link and subsequently leaves. It should be appreciated that the length of time that a link exists may be configured to meet the needs of the user, to balance server workloads, and/or otherwise reduce data congestion.

Figure 9:
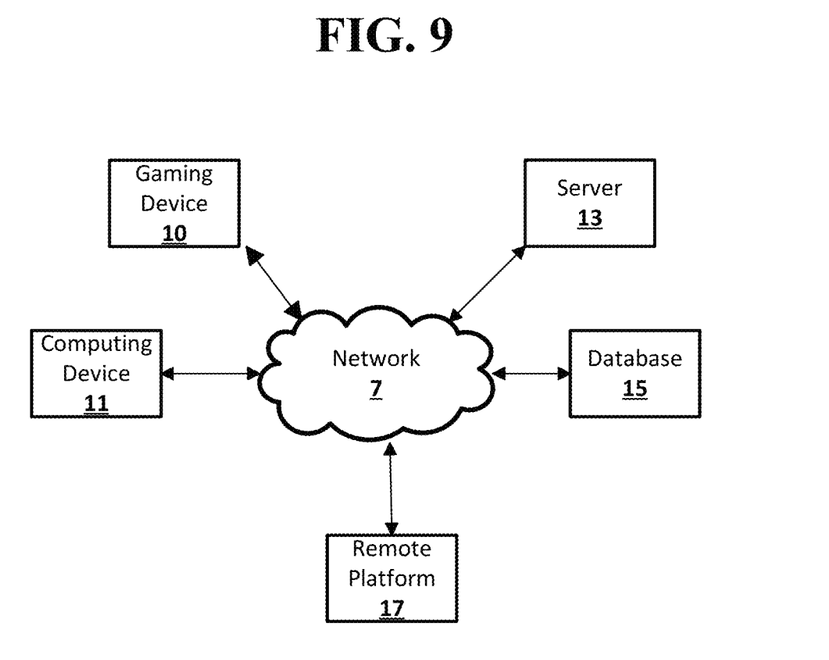
FIG. 9 shows a computing device according to an embodiment of the disclosed subject matter.

FIG. 9 shows an example network arrangement according to an embodiment of the disclosed subject matter. One or more devices 10, 11, such as local computers, smart phones, tablet computing devices, set-top boxes, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 10:
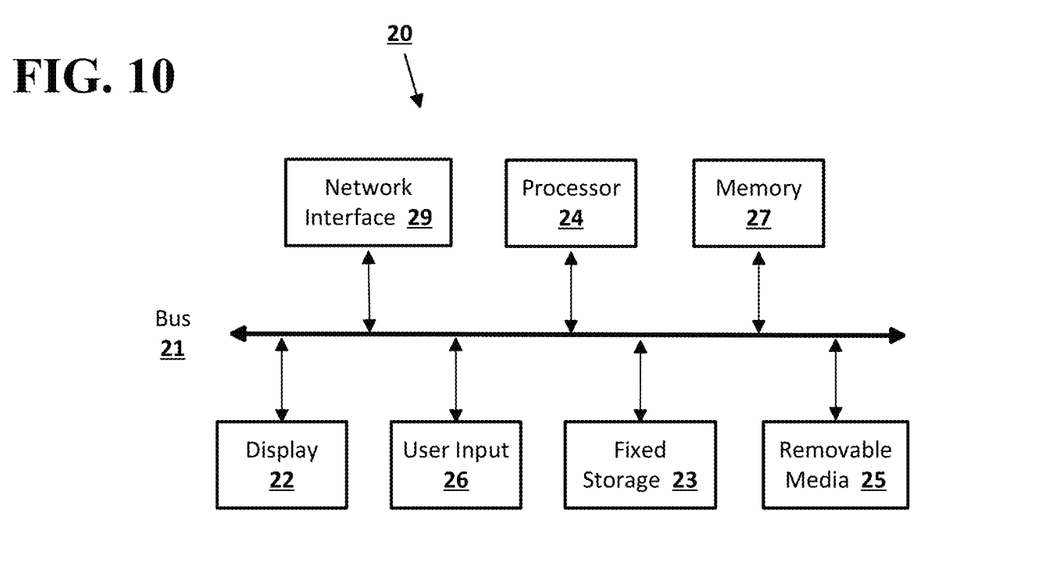
FIG. 10 shows a network configuration according to an embodiment of the disclosed subject matter.

Embodiments of the presently disclosed subject matter may be implemented in and used with a variety of component and network architectures. FIG. 10 is an example computing device 20 suitable for implementing embodiments of the presently disclosed subject matter. The device 20 may be, for example, a desktop or laptop computer, gaming console, gaming server, set-top box, or a mobile computing device such as a smart phone, tablet, or the like. The device 20 may include a bus 21 which interconnects major components of the computing device 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 10 need not be present to practice the present disclosure. The components can be interconnected in different ways from that shown. The operation of a computer such as that shown in FIG. 10 is readily known in the art and is not discussed in detail in this application. Code to implement the present disclosure can be stored in computer-readable storage media such as one or more of the memory 27, fixed storage 23, removable media 25, or on a remote storage location.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed or limited. For example, a user's identity may be treated so that no personally identifiable information can be determined for the user, or a user's geographic location may be generalized where location information is obtained (such as to a city, ZIP code, or state level), so that a particular location of a user cannot be determined. Conversely, where the user is interacting with known friends or acquaintances within a game or party, some or all personal information may be made selectively accessible by the other users. Thus, the user may have control over how information is collected about the user and used by a system as disclosed herein.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method at a first electronic device, the method comprising:

receiving a user identifier uniquely associated with an invitor;

receiving an application identifier associated with an application;

generating an invitation identifier based on the application identifier and the user identifier;

generating a link uniquely associated with the invitation identifier, the link being separate from at least the invitation identifier and causing the application to launch in response to the link being selected by one or more users including at least the invitor or at least one invitee;

providing the link to at least a second electronic device associated with the one or more users; and associating at least the invitation identifier with a user identifier of each of the one or more users in response to providing the link to the one or more users, wherein the associated invitation identifier identifies a unique multi-user session for the application comprised of the invitor and the one or more users.

2. The method of claim 1, further comprising:
receiving an indication that at least one user of the one or more users has selected the link; and
launching the at least one user into a unique session of the application, the unique session uniquely associated with the invitation identifier.

3. The method of claim 1, wherein the link is provided prior to and independently of the application being launched.

4. The method of claim 1, wherein the link is provided via an interface of the application.

5. The method of claim 1, wherein, before the application is launched, the link is provided via a web browser interface.

6. The method of claim 1, wherein the link causes the application to launch in a mode based on a selected parameter.

7. The method of claim 6, wherein the application is a video game and the selected parameter corresponds to savepoint or level information.

8. The method of claim 1, further comprising:
receiving a selection of a second device using a first device;
receiving an indication that the invitor or the at least one invitee selected the link using the first device; and
launching the application on the second device in response to the invitor or the at least one invitee having selected the link using the first device.

9. The method of claim 8, wherein the first device is incapable of launching the application.

10. The method of claim 1, wherein the invitor does not own the application.

11. The method of claim 1, wherein the at least one invitee does not own the application.

12. The method of claim 1, further comprising:
receiving a first indication that the at least one invitee has selected the link in response to the at least one invitee selecting the link, regardless of whether the invitor has selected the link.

13. The method of claim 12, further comprising:
receiving a second indication that the invitor has selected the link in response to the invitor selecting the link,
wherein the first indication is received prior to the second indication.

14. A non-transitory computer-readable media comprising instructions operable, when executed by a first electronic device, to:
receive a user identifier uniquely associated with an invitor;
receive an application identifier associated with an application;
generate an invitation identifier based on the application identifier and the user identifier;
generate a link uniquely associated with the invitation identifier, the link being separate from at least the invitation identifier and causing the application to launch in response to the link being selected by one or more users including at least the invitor or at least one invitee;
provide the link to at least a second electronic device associated with the one or more users; and
associate at least the invitation identifier with a user identifier of each of the one or more users in response to providing the link to the one or more users, wherein the associated invitation identifier identifies a unique multi-user session for the application comprised of the invitor and the one or more users.

15. The non-transitory computer-readable media of claim 14, further comprising instructions to cause the first electronic device to:
receive an indication that at least one user of the one or more users has selected the link; and
launch the at least one user into a unique session of the application, the unique session uniquely associated with the invitation identifier.

16. The non-transitory computer-readable media of claim 14, wherein the link is provided prior to and independently of the application being launched.

17. The non-transitory computer-readable media of claim 14, wherein the link is provided via an interface of the application.

18. The non-transitory computer-readable media of claim 14, wherein, before the application is launched, the link is provided via a web browser interface.

19. The non-transitory computer-readable media of claim 14, wherein the link causes the application to launch in a mode based on a selected parameter.

20. The non-transitory computer-readable media of claim 19, wherein the application is a video game and the selected parameter corresponds to savepoint or level information.

21. The non-transitory computer-readable media of claim 14, further comprising instructions to cause the first electronic device to:
receiving a selection of a second device using a first device;
receiving an indication that the invitor or the at least one invitee selected the link using the first device; and
launching the application on the second device in response to the invitor or the at least one invitee having selected the link using the first device.

22. The non-transitory computer-readable media of claim 21, wherein the first device is incapable of launching the application.

23. The non-transitory computer-readable media of claim 14, wherein the invitor does not own the application.

24. The non-transitory computer-readable media of claim 14, wherein the at least one invitee does not own the application.

25. The non-transitory computer-readable media of claim 14, further comprising:
receiving a first indication that the at least one invitee has selected the link in response to the at least one invitee selecting the link, regardless of whether the invitor has selected the link.

26. The non-transitory computer-readable media of claim 25, further comprising:
receiving a second indication that the invitor has selected the link in response to the invitor selecting the link,
wherein the first indication is received prior to the second indication.

* * * * *

UNITED STATES PATENT AND TRADEMARK OFFICE
CERTIFICATE OF CORRECTION

PATENT NO. : 11,095,724 B2
APPLICATION NO. : 16/244583
DATED : August 17, 2021
INVENTOR(S) : Kristie Fisher et al.

It is certified that error appears in the above-identified patent and that said Letters Patent is hereby corrected as shown below:

In the Claims

At Column 14 Line 35, please delete "receiving", insert --receive--

At Column 14 Line 37, please delete "receiving", insert --receive--

At Column 14 Line 39, please delete "launching", insert --launch--

At Column 14 Line 51, please insert --instructions to cause the first electronic device to-- after "comprising" and before the ":"

At Column 14 Line 52, please delete "receiving", insert --receive--

At Column 14 Line 57, please insert --instructions to cause the first electronic device to-- after "comprising" and before the ":"

At Column 14 Line 58, please delete "receiving", insert --receive--

Signed and Sealed this
Seventh Day of March, 2023

*Katherine Kelly Vidal*

Katherine Kelly Vidal
*Director of the United States Patent and Trademark Office*